(12) United States Patent
Uln et al.

(10) Patent No.: US 8,411,781 B2
(45) Date of Patent: Apr. 2, 2013

(54) METHOD AND SYSTEM FOR OPERATING A MIMO DECODER

(75) Inventors: Kiran Uln, Pleasanton, CA (US); Chih Liang Chang, Jhubei (TW)

(73) Assignee: Mediatek Inc., Hsin-Chu (TW)

( * ) Notice: Subject to any disclaimer, the term of this patent is extended or adjusted under 35 U.S.C. 154(b) by 965 days.

(21) Appl. No.: 12/483,204

(22) Filed: Jun. 11, 2009

(65) Prior Publication Data

US 2010/0316169 A1 Dec. 16, 2010

(51) Int. Cl.
*H04B 7/02* (2006.01)
*H04L 1/02* (2006.01)

(52) U.S. Cl. .................. 375/267; 375/259; 375/260

(58) Field of Classification Search .............. 375/267
See application file for complete search history.

(56) References Cited

U.S. PATENT DOCUMENTS

| | | | |
|---|---|---|---|
| 8,139,670 B1 * | 3/2012 | Son et al. ............... | 375/267 |
| 2006/0109938 A1 * | 5/2006 | Challa et al. ............ | 375/347 |
| 2007/0073897 A1 * | 3/2007 | Sharifzadeh et al. ...... | 709/238 |
| 2007/0286313 A1 * | 12/2007 | Nikopour-Deilami et al. ................ | 375/341 |
| 2008/0165874 A1 * | 7/2008 | Steele et al. ........... | 375/261 |
| 2008/0273636 A1 * | 11/2008 | Zhu et al. .............. | 375/345 |
| 2008/0279298 A1 * | 11/2008 | Ben-Yishai et al. ...... | 375/261 |
| 2008/0298493 A1 * | 12/2008 | Kim et al. ............. | 375/261 |
| 2009/0046011 A1 | 2/2009 | Tung et al. | |
| 2010/0144334 A1 * | 6/2010 | Gorokhov et al. ........ | 455/418 |
| 2010/0329395 A1 * | 12/2010 | Kang et al. ........... | 375/341 |

* cited by examiner

Primary Examiner — Erin File
(74) Attorney, Agent, or Firm — Sawyer Law Group, P.C.

(57) ABSTRACT

Varying embodiments of the present invention provide a MIMO apparatus, such as a transceiver and a method of operation thereof. In an embodiment, the transceiver employs a parallelized, two-stage pipeline architecture that reduces the overall latency of the system. This reduction in latency translates to cost savings and higher data rates for the same hardware clock speed.

28 Claims, 4 Drawing Sheets

METHOD AND SYSTEM FOR OPERATING A MIMO DECODER

FIELD OF THE INVENTION

The present invention relates generally to communication systems and more particularly to wireless communication systems.

BACKGROUND OF THE INVENTION

Personal devices, such as computers, phones, personal digital assistants and the like have gained wide popularity in recent years. As technology improves, these devices have become increasingly smaller in size and highly portable. In fact, wireless, portable devices of various types now commonly communicate with one another allowing users flexibility of use and facilitating data, voice and audio communication. To this end, networking of mobile or portable and wireless devices is required.

With regard to the wireless networking of personal devices, a particular modem, namely modems adapted to the up-coming IEEE 8302.11n industry standard, are anticipated to be commonly employed. This standard allows for an array of antennas to be placed inside or nearby the personal device and a radio frequency (RF) semiconductor device receives signal or data through the array and an analog-to-digital converter, typically located within the personal device, converts the received signal to baseband range. Thereafter, a baseband processor is employed to process and decode the received signal to the point of extracting raw data, which may be files transferred remotely and wireless, from another personal device or similar equipment with the use of a transmitter within the transmitting PC.

To do so, pointing of the array of antennas, which is essentially multiple antennas, hence the name multi-input-multi-output (MIMO), to the desired location to maximize reception and transmission quality is an issue. For example, data or information rate throughput, signal reception and link range are improved. The latest IEEE802.11n standard currently being developed includes advanced multi-antenna techniques in order to process parallel data streams simultaneously in order to increase throughput capability, and improve link quality by "smartly" transmitting and receiving the RF signals.

MIMO has drawn attention as the technique for enabling a high-capacity (high-speed) data communication by efficiently using a frequency band. The MIMO is the technique to transmit separate data streams from a plurality of antennas of a transmitter by using a plurality of antennas in both of the transmission and the reception, that is to say, by using the transmitter having a plurality of antennas and the receiver having a plurality of antennas, and individually separate a plurality of transmission signals (data streams) mixed on a transmission path from the signal received by each receiving antenna of the receiver by using a transmission path (channel) estimate value, thereby improving a transmission rate without requiring an enlargement of the frequency band.

FIG. 1 shows the general structure of a typical MIMO OFDM system according to the prior art. The MIMO transmitter 100 has multiple antennas 110A-110C each capable of transmitting independent signals to a MIMO receiver 120 which is also equipped with multiple receive antennas 130A-130B. The transmitter 100 may comprise a forward error correction (FEC) code encoder 101, an interleaver 102, a MIMO constellation Mapper 103, an OFDM MEMO IFFT 104 and an analog and RF unit 105. The MIMO receiver 120 may comprise an RF and analog unit 121, a MIMO FFT 122, a MIMO demodulator 123 (like a slicer), a de-interleaver 124 and a FEC Decoder 125, all of which are used to convert the incoming RF signals into spatial streams representing bits of information sent over the channel. The MIMO demodulator receives a plurality of spatial streams of bits, and converts them into information in a format required by the FEC decoder. In some MIMO systems the demodulator performs hard decision and delivers information bits whereas in other systems the decoder delivers soft output for further soft decoding to be performed in a Viterbi decoder, low density parity check (LDPC) decoder or the like. Here the demodulator 123 is a maximum likelihood (ML) demodulator that might employ a K-Best or Fixed Sphere Demodulator algorithm.

The ML demodulator for a MIMO receiver operates by comparing the received signal vector with all possible noiseless received signals corresponding to all possible transmitted signals. Under certain assumptions, this receiver achieves optimal performance in the sense of maximizing the probability of correct data detection. The main idea behind the a sub-optimal implementation like the K-Best algorithm or the Fixed Sphere algorithm is to perform a search over only a small subset of all possible signals located around the received signal vector. The size of this search may be determined by a combination of performance and hardware requirements. This reduced search space ensures that the demodulator complexity is not only reduced, but also fixed over time—a major advantage for hardware implementation. In order for such a search to operate efficiently, a key point is to order the antennas in such a way that most of the points considered relate to transmit antennas with the poorest signal-to-noise (SNR) conditions. Antennas with, higher SNR conditions are much more likely to be detected correctly, based only on the received signal.

The ML demodulator has exponential complexity in the number of spatial streams being received. Essentially, the complexity of this decoder increases exponentially with the number of transmit streams, making it impossible to implement for large array sizes and high order digital modulation schemes.

SUMMARY OF THE INVENTION

Varying embodiments of the present invention provide a MIMO apparatus, such as a transceiver and a method of operation thereof. In an embodiment, the transceiver generates look-up tables based on re-occurring calculations whereby searches can be minimized by sorted computations. The hardware can then be re-configured to make extra searches in more useful points and lesser searches elsewhere. This re-configurable structure increases the search speed and reduces the cost (gate count, power consumed) thereby improving the system performance.

A first embodiment of the present invention is a method of operating a multiple input multiple output (MIMO) demodulator comprising receiving a plurality of spatial streams wherein the plurality of spatial streams comprise in-phase (I) and quadrature (Q) pairs of streams, calibrating the I and Q pairs of the plurality of streams, searching each of the plurality of symbols thereby forming a search subset and systematically pruning the search subset based on a predetermined set of criteria.

A second embodiment of the present invention is a MIMO transceiver comprising a calibration module for receiving a plurality of spatial streams wherein the plurality of spatial streams comprise inphase (I) and quadrature (Q) pairs of streams wherein each of the plurality of I/Q pairs of streams comprises a plurality of symbols and calibrating the I and Q pairs of the plurality of streams, a decomposition module coupled to the calibration module for decomposing the calibrated I and Q pairs of the plurality of streams, a sorting module coupled to the decomposition module for searching each of the plurality of symbols thereby forming a search subset and systematically pruning the search subset based on a predetermined set of criteria.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENTS

The present invention relates generally to communication systems and more particularly to wireless communication systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Varying embodiments of the present invention provide a MIMO apparatus, such as a transceiver and a method of operation thereof. In an embodiment, the transceiver generates look-up tables based on re-occurring calculations whereby searches can be minimized by sorted computations. The hardware can then be re-configured to make extra searches in more useful points and lesser searches elsewhere. This re-configurable structure increases the search speed and reduces the cost (gate count, power consumed) thereby improving the system performance.

Figure 1:
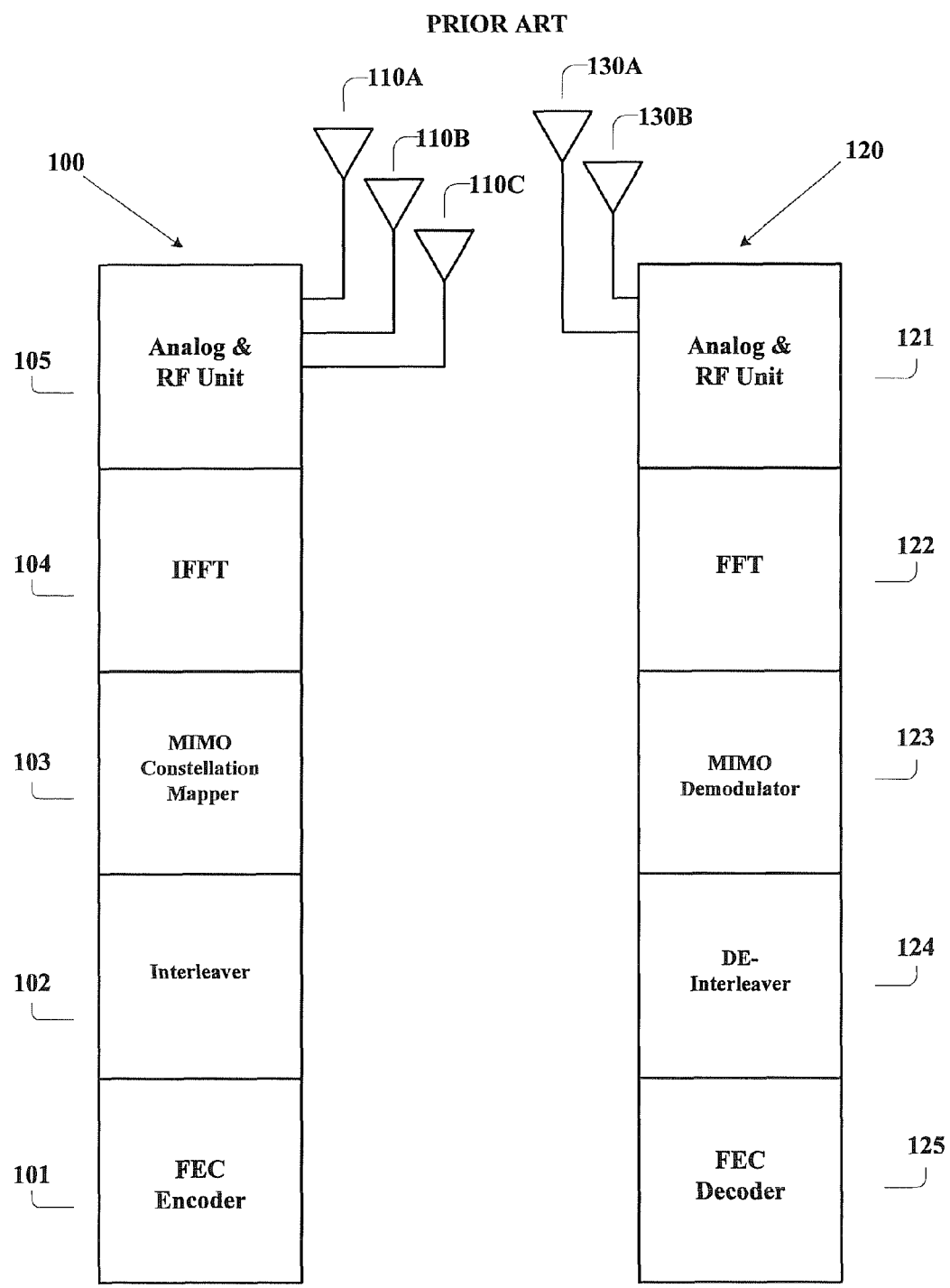
FIG. 1 shows the general structure of a typical MIMO OFDM system according to the prior art.
Figure 2:
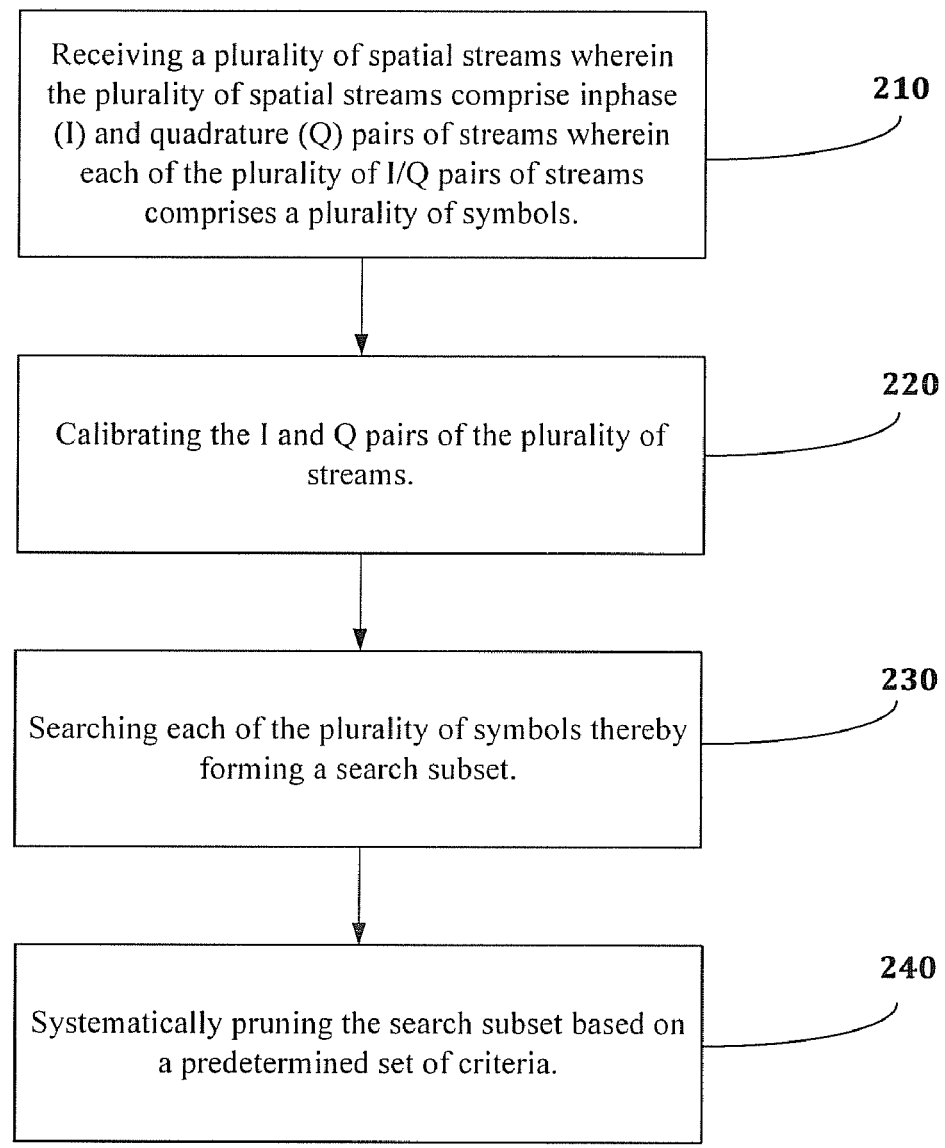
FIG. 2 illustrates a flowchart in accordance with an embodiment of the present invention.

FIG. 2 illustrates a flowchart in accordance with an embodiment of the present invention. Step 210 involves receiving a plurality of spatial streams wherein the plurality of spatial streams comprise inphase (I) and quadrature (Q) pairs of streams wherein each of the plurality of I/Q pairs of streams comprises a plurality of symbols. A second step 220 involves calibrating the I and Q pairs of the plurality of streams. A third step 230 involves searching each of the plurality of symbols thereby forming a search subset. A final step 240 includes systematically pruning the search subset based on a predetermined set of criteria The implementation of the present invention is discussed in terms of "in-phase" and "quadrature-phase" spatial streams. The term in-phase is also found in the context of communication signals:

$$A(t)=I(t)\cos(2\pi ft+\Phi(t))+Q(t)\sin(2\pi ft+\Phi(t))$$

where f and $\Phi(t)$ represents a carrier frequency and carrier phase, and A(t) represents the transmitted signal after modulation with a carrier wave, e.g.: $\cos(2\pi ft+\Phi(t))$. The component that is in phase with the original carrier is referred to as the in-phase component. The other component, which is always 90°

$$\left(\frac{\pi}{2}\text{ radians}\right)$$

"out of phase", is referred to as the quadrature component.

The system in accordance with the present invention can take the form of an entirely hardware implementation, an entirely software implementation, or an implementation containing both hardware and software elements. In one implementation, this detection procedure is implemented in software, which includes, but is not limited to, application software, firmware, resident software, microcode, etc.

Furthermore, the method can be implemented in the form of a computer program product accessible from a computer-usable or computer readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk—read/write (CD-R/W). To describe the features of the present invention in more detail, refer now to the following description in conjunction with the accompanying Figures.

Figure 3:
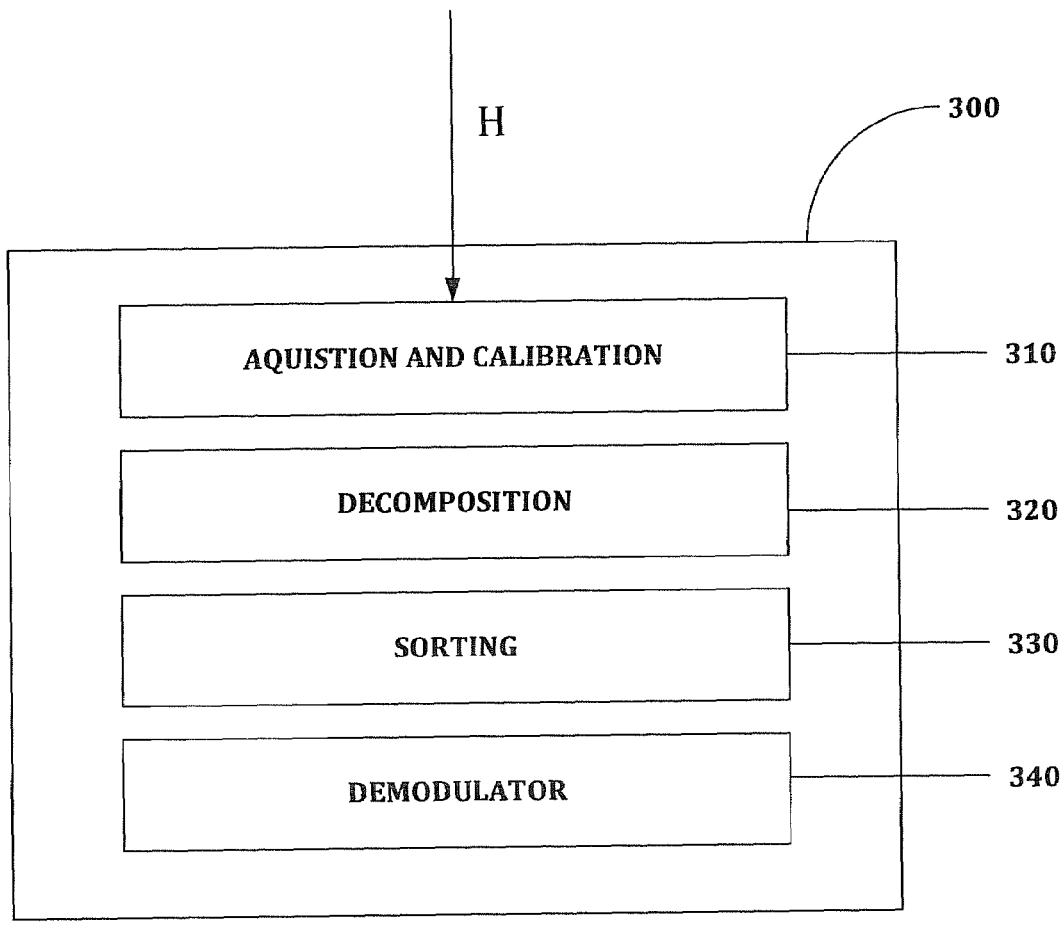
FIG. 3 shows a simplified block diagram of a transceiver system in accordance with an embodiment of the present invention.

FIG. 3 shows a simplified block diagram of a transceiver system in accordance with an embodiment of the present invention. The transceiver system 300 includes four modules. The first module is the acquisition and calibration module 310 which performs a calibration of the received plurality of spatial streams H wherein the spatial streams H comprise I and Q pairs of streams. The second module is the decomposition module 320 which performs a decomposition of the calibrated I and Q pairs of the plurality of streams wherein each of the plurality of I/Q pairs of streams comprises a plurality of symbols. Typically, each of the plurality of I/Q pairs has 10-50 symbols. The third module is a sorting module 330 which orders the received streams based on a metric. Thus, the sorting module 330 presents an order that requires the least complexity for the next block. The fourth module is a demodulator 340.

Calibration module 310 performs an I/Q calibration of the received plurality of spatial streams H. U.S. patent application 20090046011 entitled "Method and Apparatus for Calibration for Beamforming of Multi-Input-Multi-Output Orthogonol Frequency Division Multiplexing (OFDM) Transceiver", which is incorporated by reference in its entirety herein, discloses a calibration technique that could be utilized in conjunction with an embodiment in accordance with the present invention.

The output of the calibration module 310 is coupled to the decomposition module 320. Here, the calibrated I and Q pairs of the plurality of streams are decomposed thereby creating a matrix wherein the matrix comprises an upper triangular. A matrix decomposition is a factorization of a matrix into some canonical form. For instance, the QR decomposition expresses H as QR with Q a unitary matrix and R an upper triangular matrix. Accordingly, the system Hx=b (equivalently Q(Rx)=b) is solved by $Rx=Q^T b=c$, and the system Rx=c is solved by "back substitution".

The output of decomposition module 320 is coupled to the input of the sorting module 330. Here, the plurality of symbols are searched thereby forming a search subset. This search subset of the plurality of symbols are then systematically pruned based on a predetermined set of criteria. The criteria can be hardware based (for example, limiting the increase in size of the subset), metric based (for example, removing the elements of the subset which have too large a metric to be possible solutions), performance based (for example, new elements added to the subset around the existing elements with best metric). Based on this systematic pruning process, the component hardware can be re-configured to make extra searches in more useful points and reduce the number of searches elsewhere. As a result of this pruning step, the system performs more efficiently for the same cost.

With regard to the pruning step, pruning is a term in mathematics and informatics which describes a method of enumeration, which allows parts of a decision tree to be cut. Pruned parts of the tree are no longer considered because the algorithm knows based on already collected data (e.g. through sampling) that these subtrees do not contain the searched object. The decision tree is simplified by removing some decisions. Decision trees are built with the available information and they are supporting tools in a decision making process. However, sometimes the given set of data may be irrelevant, erroneous or unnecessary, in which case the decision tree formed may not be correct; this phenomenon is called overfitting. Also, too much information may misguide the decision policy. When this happens, it becomes necessary to remove nodes from the decision tree that are non-useful. The process of making the decision tree smaller by removing nodes that are not helpful is called pruning.

The search sequence can be conducted in a variety of ways. For example, a k-best algorithm could be employed. The k-best algorithm is an algorithm to cluster n objects based on attributes into k partitions, k<n. It is similar to the expectation-maximization algorithm for mixtures of Gaussians in that they both attempt to find the centers of natural clusters in the data. It assumes that the object attributes form a vector space. The objective it tries to achieve is to minimize total intra-cluster metric, like, the squared error function $$V = \sum_{i=1}^{k} \sum_{x_j \in S_i} (x_j - \mu_i)^2$$

where there are k clusters $S_i$, i=1, 2, . . . , k, and $\mu_i$ is the centroid or mean point of all the points $x_j$, $S_i$. Different metrics like the $\Lambda_1$ norm can be used to reduce complexity in certain implementations.

Another approach is the sorted-tree expansion. In this procedure, an initial sub-optimal tree is constructed with a subset of the leaves chosen for calculation. Based on the metrics returned during the training some of leaves with large metrics are removed from the list and newer leaves with the parent of the smallest metric are added. In this procedure, a close to optimal solution can be made optimal very easily. The algorithm can stop when marginal improvement is achieved with additional leaves.

It is observed that many calculations in the demodulator are re-occurring. Accordingly, a look up table can be generated based on all the calculations that are repeated multiple times. In an embodiment, the look up tables can include:

| Constellation | $D_i * s_j$ | C × 1 |
| Projection | $R_{ij} * s_k$ | C × 3 × 2 |
| Boundaries | $D_i * b_i$ | $\log_2(C) \times 3$ |

Although the above-described tables are disclosed, one of ordinary skill in the art will readily recognize that a variety of different tables could be employed while remaining within the spirit and scope of the present invention. Once the table(s) are generated, they are stored for later use by the system.

Figure 4:
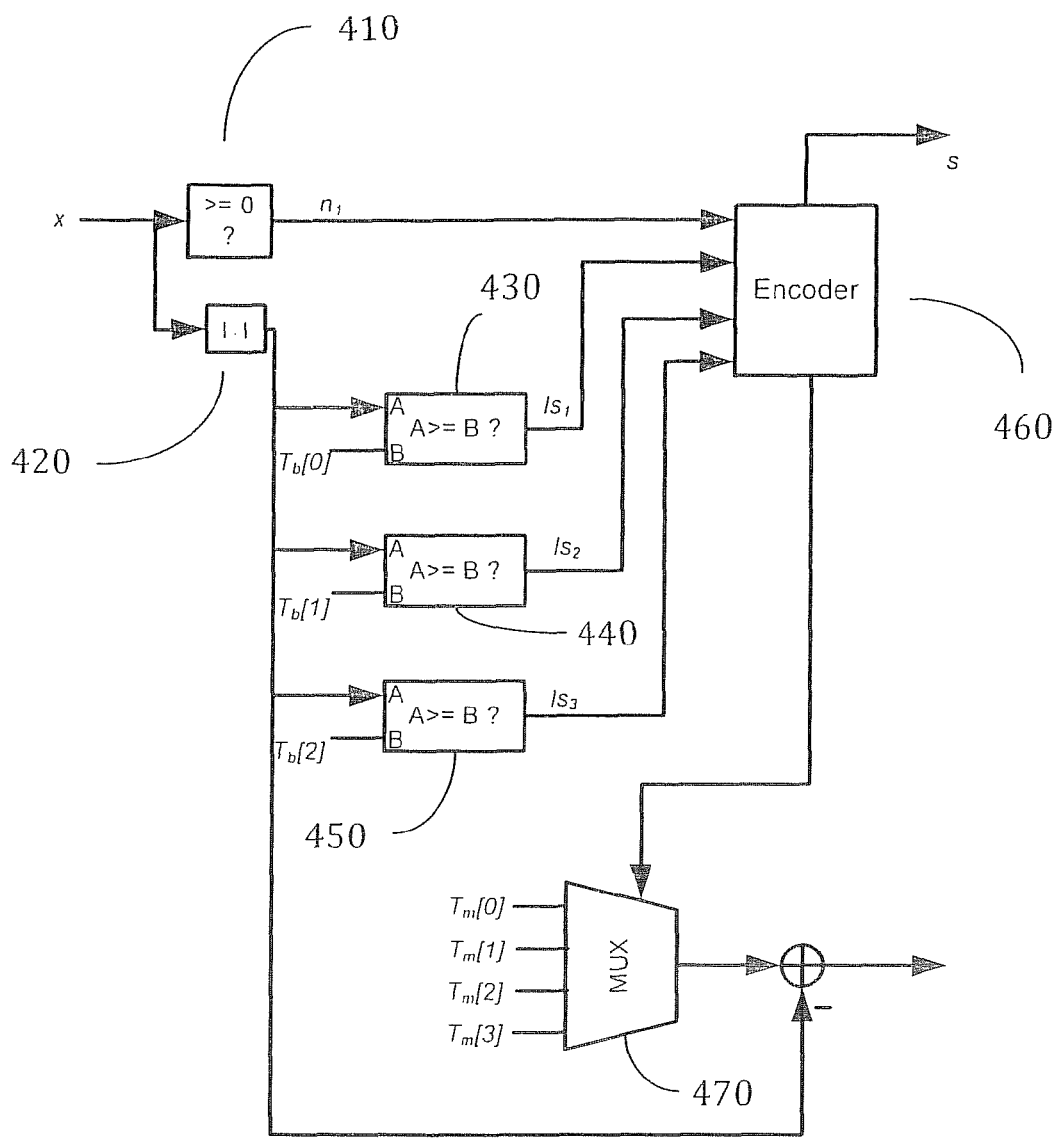
FIG. 4 shows a hardware configuration in conjunction with an embodiment of the present invention.

FIG. 4 shows a hardware configuration in conjunction with an embodiment of the present invention. FIG. 4 shows elements 410 and 420 which separate the sign and absolute value of the input. Most constellations used in practice are symmetric on positive and negative sides and this separation will reduce the number of comparison to be made. Blocks 430, 440 and 450 make comparisons with decision boundaries $T_m$ which are decided by the constellation. Once the location of the best solution is known relative to the decision boundaries, the encoder 460 along with the sign information from element 410 will determine the constellation point with the least metric corresponding to the input and the multiplexer (MUX) 470 will determine the corresponding metric. The encoder in 460 can be easily implemented as a lookup table from the possible inputs.

In an embodiment, the hardware unit described here calculates the best metric for the input. A similar hardware unit can be designed for the best-n metrics of the input, where n=2,3,4 . . . as desired by the tree-expansion algorithm. A quick complexity calculation shows that this procedure replaced 3 required multipliers with 3 comparators which are relatively inexpensive in hardware.

Varying embodiments of the present invention provide a MIMO apparatus, such as a transceiver and a method of operation thereof. In an embodiment, the transceiver generates look-up tables based on re-occurring calculations whereby searches can be minimized by sorted computations. The hardware can then be re-configured to make extra searches in more useful points and lesser searches elsewhere. This reconfiguration requires no change in the hardware unit and all changes are limited to the table being generated. This re-configurable structure increases the search speed and reduces the cost (gate count, power consumed) thereby improving the system performance.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although these inventive concepts have been described in terms of certain embodiments, other embodiments that are apparent to those of ordinary skill in the art are also within the scope of this invention, as defined in the claims that follow.

What is claimed is:

1. A method of operating a multiple input multiple output (MIMO) decoder comprising:
   (a) receiving a plurality of spatial streams wherein the plurality of spatial streams comprise inphase (I) and quadrature (Q) pairs of streams;
   (b) calibrating the I and Q pairs of the plurality of streams;
   (c) decomposing the calibrated I and Q pairs of the plurality of streams, wherein each of the calibrated decomposed I/Q pairs of streams comprises a plurality of symbols;
   (d) searching each of the plurality of symbols thereby forming a search subset; and
   (e) systematically pruning the search subset based on a predetermined set of criteria.

2. The method of claim 1 wherein systematically pruning the plurality of symbols further comprises:
   (d1) determining a best subset to prune the plurality of symbols.

3. The method of claim 1 wherein each of the plurality of symbols further comprises a plurality of leaves and systematically pruning the plurality of symbols further comprises:
   (d1) searching the entire plurality of leaves.

4. The method of claim 3 further comprising:
   (d1a) determining useful leaves of the plurality of leaves based on a set of criteria;
   (d1b) removing non-useful leaves based on the set of criteria resulting in a remaining plurality of leaves.

5. The method of claim 4 wherein the set of criteria comprises a distance metric of the vector space.

6. The method of claim 5 wherein a useful leaf comprises a leaf with a small metric.

7. The method of claim 5 wherein a non-useful leaf comprises a leaf with a large metric.

8. The method of claim 4 further comprising:
   (d1c) determining whether to add more leaves to the remaining plurality of leaves.

9. The method of claim 8 further comprising:
   (d1d) adding more leaves to the remaining plurality of leaves.

10. The method of claim 4 further comprising:
    (d1c) disabling unused hardware components associated with the non-useful leaves.

11. The method of claim 10 wherein non-disabled hardware units are re-configured to search the newly added leaves.

12. A computer program product tangibly embodied on a computer usable medium for controlling user access to stored data elements, the computer program product having computer readable program means for causing a computer to perform the acts of:
    (a) receiving a plurality of spatial streams wherein the plurality of spatial streams comprise inphase (I) and quadrature (Q) pairs of streams;
    (b) calibrating the I and Q pairs of the plurality of streams;
    (c) decomposing the calibrated I and Q pairs of the plurality of streams, wherein each of the calibrated decomposed I/Q pairs of streams comprises a plurality of symbols;
    (d) searching each of the plurality of symbols thereby forming a search subset; and
    (e) systematically pruning the search subset based on a predetermined set of criteria.

13. The computer program product of claim 12 wherein systematically pruning the plurality of symbols further comprises:
    (d1) determining a best subset to prune the plurality of symbols.

14. The computer program product of claim 12 wherein each of the plurality of symbols further comprises a plurality of leaves and systematically pruning the plurality of symbols further comprises:
    (d1) searching the entire plurality of leaves.

15. The computer program product of claim 14 further comprising:
    (d1a) determining useful leaves of the plurality of leaves based on a set of criteria;
    (d1b) removing non-useful leaves based on the set of criteria resulting in a remaining plurality of leaves.

16. The computer program product of claim 15 wherein the set of criteria comprises a metric of the vector space.

17. The computer program product of claim 16 wherein a useful leaf comprises a leaf with a small metric.

18. The computer program product of claim 16 wherein a non-useful leaf comprises a leaf with a large metric.

19. The computer program product of claim 15 further comprising:
    (d1c) determining whether to add more leaves to the remaining plurality of leaves.

20. The computer program product of claim 19 further comprising:
    (d1d) adding more leaves to the remaining plurality of leaves.

21. The computer program product of claim 15 further comprising:
    (d1c) disabling unused hardware components associated with the non-useful leaves.

22. The computer program product of claim 21 wherein non-disabled hardware units are re-configured to search the newly leaves.

23. A MIMO transceiver comprising;
    a calibration module for:
       receiving a plurality of spatial streams wherein the plurality of spatial streams comprise inphase (I) and quadrature (Q) pairs of streams and;
       calibrating the I and Q pairs of the plurality of streams;
    a decomposition module coupled to the calibration module for decomposing the calibrated I and Q pairs of the plurality of streams wherein each of the calibrated decomposed I and Q pairs of the plurality of streams comprises a plurality of symbols; and
    a sorting module coupled to the decomposition module for searching each of the plurality of symbols thereby forming a search subset and systematically pruning the search subset based on a predetermined set of criteria.

24. The transceiver of claim 23 wherein each of the plurality of symbols further comprises a plurality of leaves and systematically pruning the plurality of symbols further comprises:
    searching the entire plurality of leaves.

25. The transceiver of claim 24 further wherein searching the entire plurality of leaves comprises:
    determining useful leaves of the plurality of leaves based on the predetermined set of criteria;
    removing non-useful leaves based on the set of criteria resulting in a remaining plurality of leaves.

26. The transceiver of claim 25 wherein the predetermined set of criteria comprises a metric of the vector space.

27. The transceiver of claim 26 wherein a useful leaf comprises a leaf with a small metric.

28. The transceiver of claim 26 wherein a non-useful leaf comprises a leaf with a large metric.

* * * * *